United States Patent
Lorber

(12) 
(10) Patent No.: US 6,171,056 B1
(45) Date of Patent: Jan. 9, 2001

(54) TECHNIQUE FOR PROVIDING A SIGNAL FOR CONTROLLING BLADE VORTEX INTERACTION NOISE OF A ROTORCRAFT

(75) Inventor: Peter F. Lorber, Coventry, CT (US)

(73) Assignee: Sikorsky Aircraft Corporation, Stratford, CT (US)

( * ) Notice: Under 35 U.S.C. 154(b), the term of this patent shall be extended for 0 days.

(21) Appl. No.: 09/221,290

(22) Filed: Dec. 23, 1998

(51) Int. Cl.$^7$ .................................................. B64C 27/04
(52) U.S. Cl. ........................ 416/42; 415/119; 244/17.13; 244/199; 416/61
(58) Field of Search ................................ 415/119; 416/1, 416/23, 24, 36, 42, 61, DIG. 5; 244/17.13, 199, 203

(56) References Cited

U.S. PATENT DOCUMENTS

| | | | |
|---|---|---|---|
| 5,137,427 | 8/1992 | Shenoy | 416/223 R |
| 5,711,651 | 1/1998 | Charles et al. | 416/24 |
| 5,788,191 | 8/1998 | Wake et al. | 244/199 |
| 5,813,625 | 9/1998 | Hassan et al. | 244/17.11 |
| 5,938,404 | * 8/1999 | Domzalski et al. | 415/119 |

OTHER PUBLICATIONS

Lorber, Peter F. "Blade–Vortex Interaction Data Obtained from a Pressure–Instrumented Model Rotor at the DNW", Presented at the American Helicopter Society/Royal Aeronautical Society International Technical Specialists Meeting on Rotorcraft Acoustics and Rotor Fluid Dynamics, Philadelphia, PA, Oct. 15–17, 1991, pp.1–14.

Lorber, Peter F., "Aerodynamic Results of a Pressure–Instrumented Model Rotor Test at the DNW", Journal of the American Helicopter Society, Oct. 1991, pp.66–76.

Charles, B. D. et al., "Effects of a Trailing Edge Flap on the Aerodynamics and Acoustics of Rotor Blade–Vortex Interactions", DGLR/AIAA 14th Aeroacoustics Conference, Aachen, Germany, May 11–14, 1992, pp. 153–162.

* cited by examiner

*Primary Examiner*—Edward K. Look
*Assistant Examiner*—Liam McDowell
(74) *Attorney, Agent, or Firm*—Stephen A. Schneeberger; Brian D. Lefort; Ronald G. Cummings

(57) ABSTRACT

A technique for providing a signal representative of blade vortex interaction (BVI) noise for a multi-blade rotorcraft. The fluid (air) pressure at one, two, or more predetermined locations on a rotor blade is measured during at least one predetermined azimuthal segment of blade rotation during operation to provide respective pressure measurements. The pressure measurements are processed to provide a signal for use as a control variable in a control system for the active control of BVI noise. The pressure measurements are made within 10% blade chord length of the blade leading edge and preferably two or more are made between 65% and 95% of blade radial-length. The pressure measurements are filtered and the band of retained frequencies is between 20 and 48 times the rotor rotation frequency. An algorithm operative over a determined blade frequency range optimizes the signal for control use.

13 Claims, 4 Drawing Sheets

TECHNIQUE FOR PROVIDING A SIGNAL FOR CONTROLLING BLADE VORTEX INTERACTION NOISE OF A ROTORCRAFT

The invention described herein was made in the performance of work under U.S. Navy Contract No. N00014-96-C-2079.

1. Technical Field

This invention relates to the control of blade vortex interaction (BVI) noise in rotorcraft, and more particularly to signals useful in the control of such BVI.

2. Background Art

In the realm of rotorcraft (e.g., helicopter and tilt rotor) design and operation, the phenomenon of blade-vortex interaction (BVI) noise has long been recognized as an undesirable characteristic. This phenomenon results from the vortices, shed by the rotor blades and blade tips as they advance, impacting a following rotor blade. The noise occasioned by BVI is most pronounced during descent of the rotorcraft, at low speed, typically upon approach to a landing site or field. Such noise may be particularly annoying to persons on the ground near the landing site and/or in the flight path. Moreover, the BVI noise may pose a security hazard to the rotorcraft under military conditions, because it is rendered more detectable to the human ear and/or to other acoustical sensing devices. For these reasons, considerable analysis has been conducted and a variety of techniques have previously been suggested or used in an effort to reduce the occurrence and/or intensity of BVI noise during rotorcraft operation.

Examples of analyses conducted and data obtained regarding BVI are contained in papers by the present inventor, Peter F. Lorber, entitled "Aerodynamic Results of a Pressure-Instrumented Model Rotor Test at the DNW", presented in the Journal of the American Helicopter Society, 1990, and "Blade-Vortex Interaction Data Obtained from a Pressure-Instrumented Model Rotor at DNW", presented in 1991. These materials disclose the instrumenting of rotor blades with numerous pressure sensors and obtaining blade pressure measurements occasioned by BVI under a variety of simulated operating conditions and at various azimuthal positions of the instrumented blades. This data revealed significant information about the physics and aerodynamics of BVI noise generation.

Efforts to diminish BVI noise have broadly involved passive means and active means. The passive means have typically involved structural modifications of or additions to the rotor blades, generally in the tip region which generates the vortices. An example of such a passive device is described in U.S. Pat. No. 5,788,199 to Wake et al. for "Half-Plow Vortex Generators for Rotor Blades for Reducing Blade-Vortex Interaction Noise," assigned to the assignee of the present application. There, a supplemental structure is mounted on each main rotor bade to generate a vortex rotating in opposition to that naturally generated by the blade tip to thereby attenuate any resulting vortex.

Examples of active devices for reducing BVI noise also include the aforementioned U.S. Pat. No. 5,788,199 in that it also discloses selectively deploying and retracting the vortex generator 10 either as a function of general flight conditions, i.e., descent, or as a more rapid function of azimuthal position of the rotor blade during rotation of the rotor (column 6, line 65 to column 7, line 29). A further example of an active means for attenuating BVI noise is described in a paper entitled "Effects of a Trailing Edge Flap on the Aerodynamics and Acoustics of Rotor Blade-Vortex Interactions" by B. D. Charles, et al. at pages 153–161 of Vol. 1 of the Proceeding of DGLR/AIAA $14^{th}$ Aeroacoustics Conference of May 11–14, 1992. That paper describes the active control of flaps on rotor blades as a technique for BVI noise attenuation. Deployment of the flaps to various angles during various angular or azimuthal segments of blade rotation were analyzed for optimum results. The principles of the aforementioned paper appear also in U.S. Pat. No. 5,711,651 for "Blade Vortex Interaction Noise Reduction Techniques for a Rotorcraft" by Charles et al., which describes an active device (flaps) selectively deployable during rotation of the rotor blades through predetermined regions of the rotor azimuth.

While the passive devices provide the advantage of reduced complexity and perhaps less cost and weight, they do not afford the flexibility of active devices to adapt to changing BVI conditions throughout the flight regime, as with changes in speed and descent rate. Both of the aforementioned U.S. Pat. Nos. 5,788,199 and 5,711,651 mention the advantages of deploying or actuating the active device only during the period in which the rotorcraft is operating in a flight condition wherein significant BVI noise is likely to be generated. As disclosed in the U.S. Pat. No. 5,711,651, a predetermining schedule may be used to deploy the active device during the relevant region, or regions, of the blade rotation azimuth.

Relative to a fixed passive system or device, the actuation of active devices in response to a predetermined schedule affords a greater degree of flexibility in attaining BVI noise abatement and reducing the penalties associated with the drag caused by continuous deployment of a device. However, inefficiencies remain because of the need to predetermine a schedule of actuation based solely on previously determined BVI conditions as a function of descent rate, flight speed, device geometry and characteristics, etc.

What is needed is a technique for increasing or optimizing the efficiency and effectiveness of an active system for the reduction of BVI noise associated with the rotor of a rotorcraft.

DISCLOSURE OF INVENTION

A principal object of the present invention is to provide a technique for improving the efficiency and/or effectiveness of controlling active devices for the reduction of BVI noise associated with rotorcraft.

According to the present invention, there is provided a technique for improving the efficiency and/or effectiveness of controlling active devices for reducing BVI noise associated with rotorcraft. More specifically, according to the present invention there is provided a method for providing a control signal representative of blade vortex interaction noise for a rotorcraft having a multiblade rotor, which signal is provided for use as a control variable in a rotorcraft control system for the active control of BVI noise. The signal is provided by measuring the fluid (air) pressure at one or more predetermined locations on a rotor blade during at least one predetermined azimuthal segment of blade rotation to provide respective pressure measurements, and processing the respective pressure measurements to provide a signal for use as a control variable.

The air pressure is measured at two or more locations on the blade between 65% and 95% of the radial length of the blade and within 10% blade chord length of the leading edge of the rotating blade. The pressure is measured preferably at least during an azimuthal segment in which the blade is advancing relative to forward flight of the rotorcraft, particularly within the quadrant measured angularly forward 90° from the tail of the rotorcraft. It may additionally be separately measured during an azimuthal segment in which the blade is retreating relative to forward flight of the rotorcraft.

The pressure measurements are processed by filtering to retain substantially only a frequency band commensurate with BVI sources, typically between 20 and 48 times the rotation frequency of the rotor. The filtered pressure measurements are further processed in accordance with:

$$Fn_1, n_2 = \sqrt{\frac{1}{n_2 - n_1 + 1}\sum_{n_1}^{n_2} f_n^2}, \text{ where}$$

where $Fn_1, n_2$ is the signal for use as the control variable, fn is the Fourier amplitude over a specified azimuthal segment of blade rotation, and $n_1$ and $n_2$ are frequency limits based on n per full revolution.

The value of $n_1$ and $n_2$ are initially determined by wind tunnel measurements for a particular set of test conditions simulating descent and are subsequently correlated with BVI far field acoustic sound pressure levels for the same set of test conditions. Values of $n_1$ and $n_2$ being substantially 24 and 32 respectively have been determined for one rotorcraft system.

The resulting signal is then available for use as the control variable in a rotorcraft control system for the active control of BVI noise, typically as a feedback type of signal to be nulled or minimized by the active control.

The foregoing and other objects, features and advantages of the present invention will become more apparent in light of the following detailed description of exemplary embodiments thereof as illustrated in the accompanying drawings.

BEST MODE FOR CARRYING OUT THE INVENTION

Figure 1:
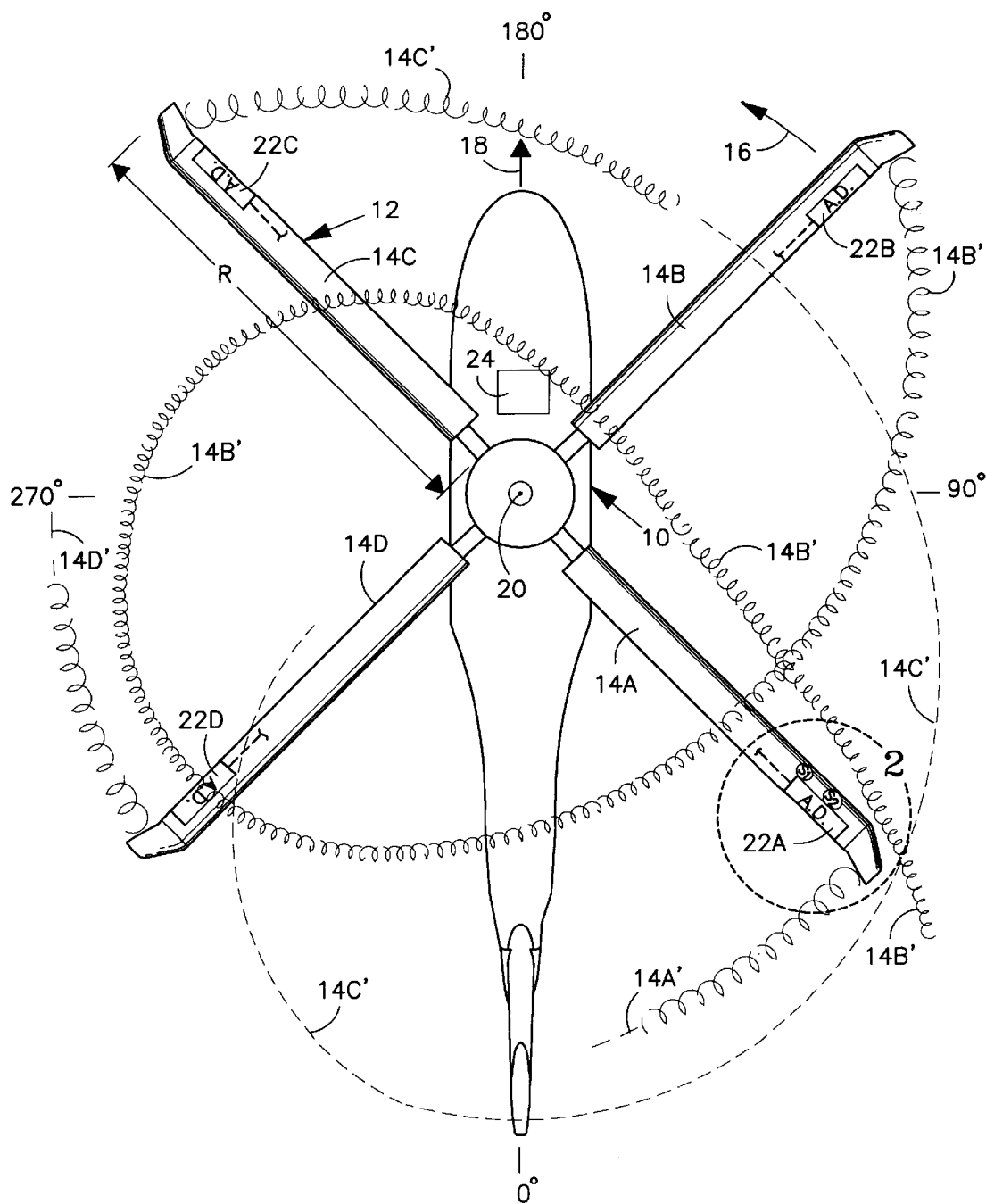
FIG. 1 is a simplified top plan view of a rotorcraft depicting blade vortices and the BVI noise suppression technique of the invention.

Referring to FIG. 1, there is depicted a helicopter or rotorcraft viewed from above during flight. In the illustrated example, the rotorcraft has a rotor assembly 12, comprised of four rotor blades 14A, 14B, 14C and 14D respectively, each having a radial length R. The rotor blades 14A–D are disposed at 90° to each adjacent blade and rotate counterclockwise as indicated by direction arrow 16. In FIG. 1, the rotorcraft 10 is shown in forward flight, as represented by the flight vector arrow 18.

As the rotor 12 rotates about an axis 20, the tips of rotor blades 14A–D generate vortices 14A', 14B', 14C' and 14D' respectively. The paths of the vortices 14A'–D' leaving the blades as the blades advance will vary as a function of forward flight speed, rotor thrust, and descent angle amongst other things. It can be seen from the paths of vortices 14A'–D' in FIG. 1 that they appear to move in a helical pattern when viewed from above radially inward relative to succeeding blades 14A–D, at least in the two advancing-blade quadrants depicted as extending from 0° (over the rotorcraft tail) through 90° (to right of rotorcraft) to 180° (forward of the rotorcraft). The azimuthal position of a blade 14A–D is conveniently referenced in an angular reference system which places 0° over the tail of the rotorcraft 10.

At certain regimes within the operation of rotorcraft 10 the impact of vortices on advancing blades, particularly in the first quadrant from 0° to 90°, such as the near parallel interaction of vortex 14B and blade 14A, may be very significant and create significant undesirable audible BVI noise in the far field where persons or listening devices may be located. As noted, such operating regimes typically involve descent and/or maneuver of the rotorcraft 10.

The physics and aerodynamic research results disclosed in the aforementioned publications of the present inventor are incorporated herein by reference. More specifically, some of the information developed therein may be utilized and refined to provide a control signal in accordance with the invention. That control signal is then available to be used for refined control of various active devices to secure improved attenuation or suppression of BVI noise acoustically detected in the far field.

Figure 2:
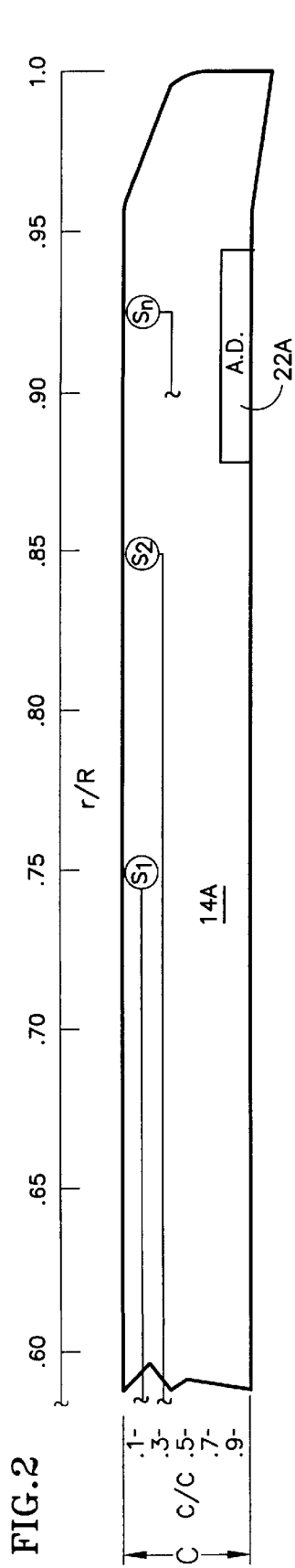
FIG. 2 is a top plan view of a portion of an instrumented rotor blade in accordance with the invention.

Referring further to FIG. 1 and additionally to FIG. 2, the rotor assembly 12 is depicted as having at least two pressure sensors, $S_1$ and $S_2$, mounted on the surface of a blade, e.g., blade 14A, relatively toward the leading edge and the radially outer region. Moreover, each blade 14A–D includes a respective active device (AD) 22A–D capable of actuation between various states for attenuating the creation of blade tip vortices 14A'–D' and/or for moving blades 14A–D relatively out of plane so as to lessen the blade-vortex interaction. This latter type of control may be afforded by active devices of the type disclosed in the aforementioned U.S. Pat. No. 5,711,651, i.e., independently controlled flaps.

Further depicted in FIG. 1, a control system 24 receives, at least, pressure measurements from sensors $S_1$ and $S_2$ and provides a signal which is reflective of pressure-dependent BVI noise characteristics, which signal is then used as a control variable in the control and actuation of the active devices 22A–D.

Referring further to FIG. 2, the radially outer portion of the instrumented blade 14A of FIG. 1 is shown enlarged and depicting the placement of at least the two pressure sensors $S_1$ and $S_2$ within a region which has been determined to be a strong BVI source. Specifically, at least those two pressure sensors, and preferably also any additional pressure sensors $S_n$, are positioned on the surface of blade 14A in a region between about 65% and 95% of the blade radius R and within 10% blade chord length of the leading edge of the blade. The scale appearing adjacent the leading edge of the blade 14A in FIG. 2 reveals the station r of sensor $S_1$ to be about 0.75, or 75%, of blade radius R and the station r of sensor $S_2$ to be about 0.85, or 85%, of blade radius R. The optional further pressure sensors $S_n$ are also within the same range between 65% and 95° R. Moreover, the sensors $S_1$ and $S_2$ (and $S_n$) are depicted as being at respective stations c which are each within 10% blade chord length C of the leading edge of blade 14A or built into the blade with a measurement port on the surface. The pressure sensors $S_1$ and $S_2$ are preferably of a known type having good sensitivity and a very small size and low profile. The sensors $S_1$ and $S_2$ are affixed, as by bonding, to a surface of blade 14A. Although shown here as being affixed to the upper surface of blade 14A, which reduces abrasion by debris from below, the sensors $S_1$ and $S_2$ may alternatively be mounted to the lower surface of blade 14A.

Figure 3:
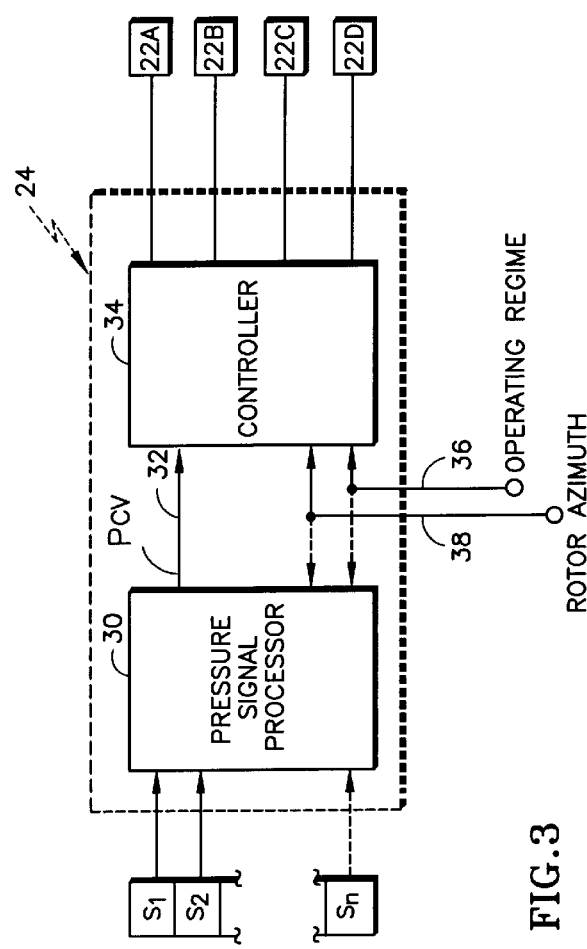
FIG. 3 is a schematic functional block diagram of the BVI noise suppression control in accordance with the invention.

Referring to FIG. 3, the pressure sensors $S_1, S_2 \ldots S_n$ extend their respective signals to the control system 24, and more particularly to a pressure signal processor 30 forming a portion thereof. The pressure signal processor 30 analyzes the pressure signals from the sensors $S_1, S_2$ in a manner to be hereinafter described, and provides a resulting value or signal, Pcv on line 32, shown as extending to controller 34. The controller 34 also forms part of control system 24. The pressure signal processor 30 and the controller 34 may be separate, dedicated elements or they may be structurally integrated in form. Moreover, it is preferable that most or all of the electronic processing be performed by a digital processor suitably programmed to accomplish the requisite functions. The controller 34 is also shown as receiving an Operating Regime input on line 36 and a Rotor Azimuth input on line 38. These inputs may alternatively, or additionally, be extended to the pressure signal processor 30. The output, or outputs, from controller 34 and thus from control system 24, extend to the respective active devices 22A–D to effect the commanded action. The pressure signals from sensors $S_1, S_2 \ldots S_n$ to control system 24, and the signals from control system 24 to the active devices 22A–D pass between the rotor blades 14A–D and the fuselage of rotorcraft 10 via an appropriate slip ring arrangement (not shown).

It will be appreciated that the controller 34 may execute suitable control algorithms for the particular active devices 22A–D; however, the particular algorithms are not within the scope of the present invention. Rather, the controller 34 and the active devices 22A–D are programmed or scheduled to respond to the control variable signal Pcv in a way that seeks to lessen or null that signal by reducing BVI noise. For example, the Operating Regime input on line 36 and the Rotor Azimuth input on line 38 may serve to command and control a basic, or primary, schedule of control signals to reduce BVI; however, the control variable signal Pcv serves to refine that schedule.

Figure 4A:
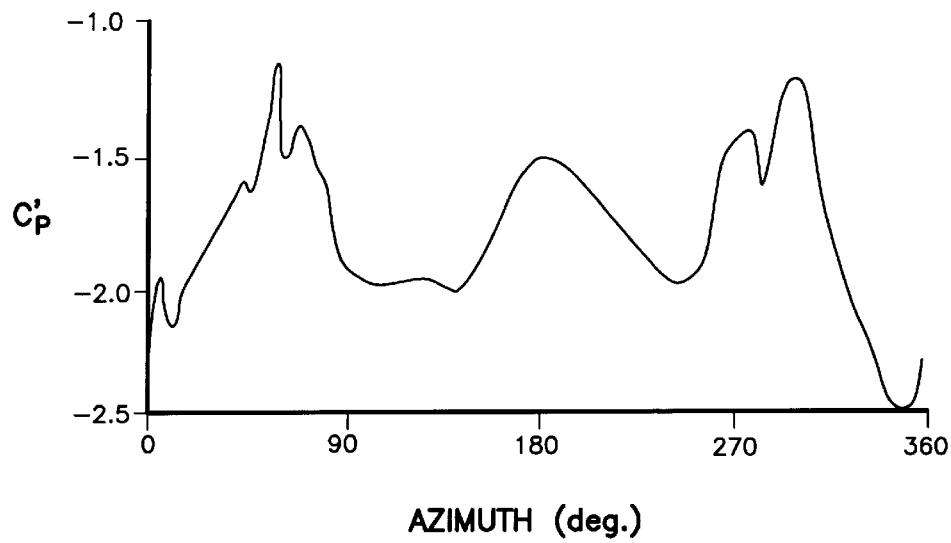
FIG. 4A is a typical graphical plot of pressure at a rotor blade as a function of blade azimuth.

Attention is now turned to the development of signal Pcv in accordance with the invention. Referring to FIG. 4A, there is depicted a plot of pressure versus blade azimuth, as measured by a pressure sensor such as $S_1$ or $S_2$ positioned on blade 14A as previously described. In FIG. 4A, the pressure sensor was positioned at about 77% of the radial length R of blade 14A and about 5% blade chord length from the leading edge of the blade. The resulting pressure signal has been normalized to account for the effects of free stream pressure and rotational dynamic pressure.

Figure 4B:
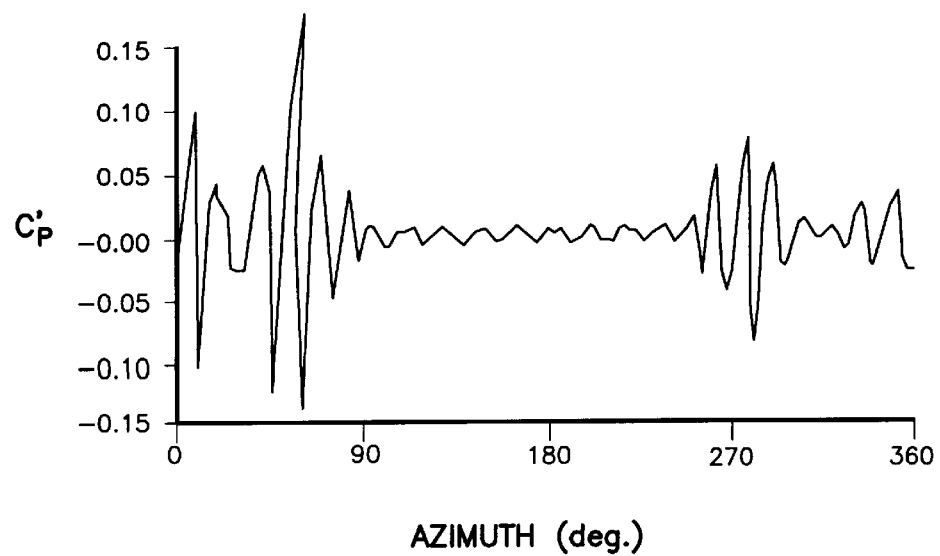
FIG. 4B is a graphical plot of pressure depicted in FIG. 4A following filtering to remove lower harmonics of the blade rotation frequency.

Referring to FIG. 4B, the pressure signal of FIG. 4A has been filtered to retain the frequency band important as a BVI source for the particular rotorcraft system. The BVI noise source is typically comprised of a narrow band of frequencies, typically between 20 and 48 times the rotor rotation frequency. For example, if the rotor 12 rotates at 5 Hz, the BVI source band would include 100 to 240 Hz. Thus the signal depicted in FIG. 4B shows the results of digitally filtering the pressure signal of FIG. 4A and clearly reveals the significant activity in the first quadrant for the advancing blade at about 70° azimuth and in the fourth quadrant for the retreating blade at about 275° azimuth. It is preferable to separate the advancing side signal from the retreating side signal so that each may provide the requisite control at the appropriate time or position during rotation of rotor 12. Moreover, because there are at least two pressure signals from the sensors $S_1$ and $S_2$ respectively, it is desirable to average those values to provide the pressure signal for signal procesing.

After filtering the raw pressure signal, the pressure signal processor 30 defines as the metric Pcv, the sum of Fourier amplitudes of the blade pressure measured at blade 14A over the relevant frequency limits $n_1$ and $n_2$. This summation may be expressed as:

$$Fn_1, n_2 = \sqrt{\frac{1}{n_2 - n_1 + 1} \sum_{n_1}^{n_2} f_n^2} , \text{ where}$$

where
  $Fn_1, n_2$ is the signal for use as the control variable,
  fn is the Fourier amplitude over a specified azimuthal segment of blade rotation, and
  $n_1$ and $n_2$ are frequency limits based on n per full revolution.

It is preferable also to apply a window function before computing the finite Fourier Transform (FFT), since the signals are not periodic over a partial azimuth range. In the present instance, a Welch window was used as follows: The pressure data $P(t_n)$ was multiplied by the window function $$W(t_n) = (P(t_n) - \overline{p}) \left(1 - \frac{n - \frac{N}{2}}{\frac{N}{2}}\right)^2$$

prior to computation of the Fourier transform, where $\overline{p}$ is the average value of the pressure data used.

Figure 5A:
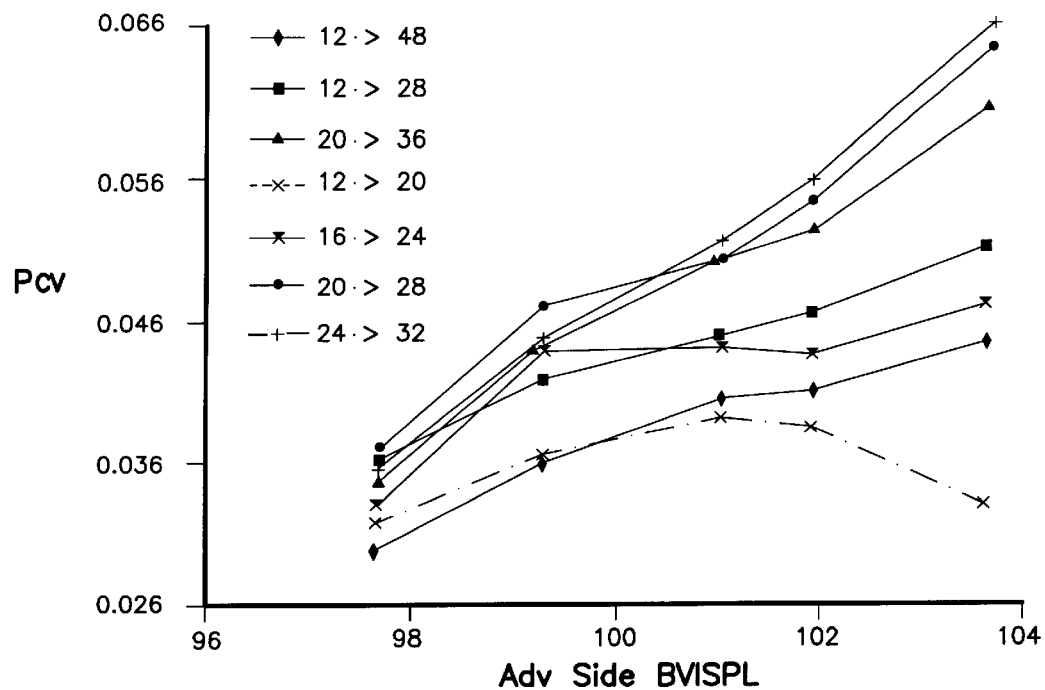
FIG. 5A is a graphical plot of blade pressure coefficients versus BVI far field acoustic sound pressure levels for different values of frequency ranges.
Figure 5B:
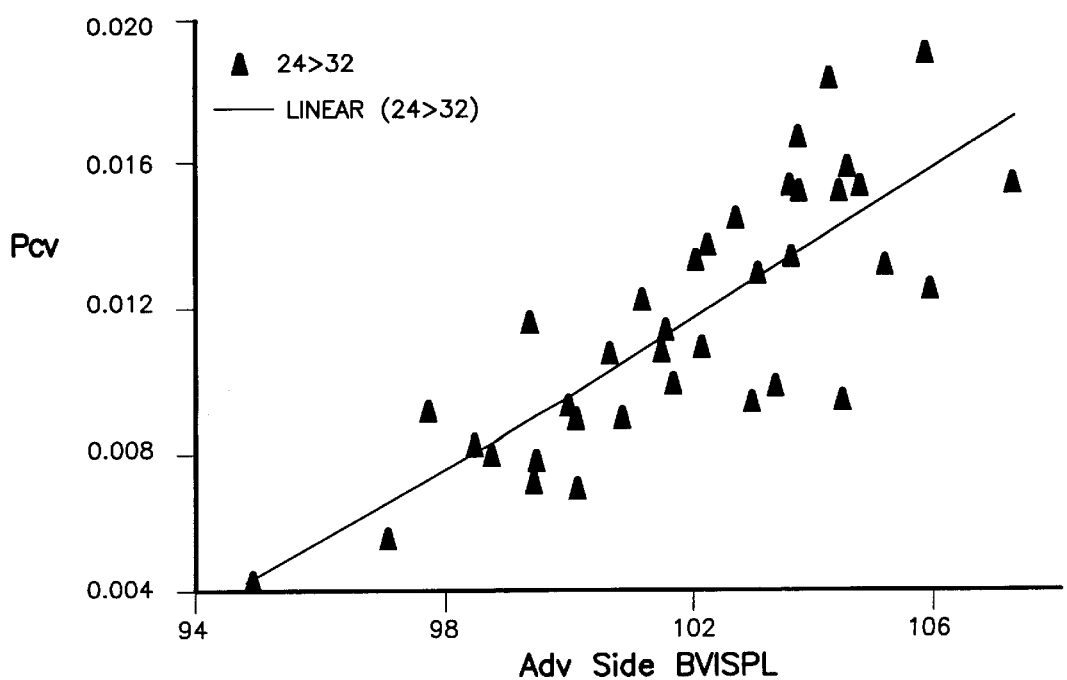
FIG. 5B is a graphical plot of blade section thrust values for a selected frequency range from FIG. 5A over multiple sweeps of the rotor.

To identify effective values of $n_1$ and $n_2$ for use in the summation of the Fourier transform, tests may be conduced on models during wind tunnel tests or on actual rotorcraft under conditions simulating descent to identify probable values offering the most effective results. Further, that test data is correlated with the measurement of actual BVI far field acoustic sound pressure levels (BVISPL) under the same conditions. The results of such wind tunnel tests for a single forward flight speed and five different simulated descent angles for several ranges of $n_1$ and $n_2$ values are depicted in FIG. 5A, where Pcv is computed using pressure measurements averaged from two sensors at 77% and 92% R and Adv Side BVISPL represents the BVI noise from the advancing side blade as actually measured in the far field. The preferred ranges of $n_1, n_2$ values are those only having positive slopes, and the more linear with respect to the far field measurements, the better. In the embodiment tested and described herein for a 1/6 scale UH-60A Black Hawk helicopter, the range wherein $n_1$ is 24 and $n_2$ is 32 appears to provide the best results. This is further confirmed in FIG. 5B which depicts a plot of Pcv versus the measured far field noise for several other forward flight speeds and descent angles. The linearity appears to be preserved.

Having thus determined the appropriate arrangement of sensors $S_1, S_2 \ldots S_n$ and the appropriate frequency limits for summing the Fourier amplitudes, the pressure signal processor 30 determines the metric control variable designated Pcv. That signal, typically in conjunction with the scheduling provided by the Operating Regime and the Rotor Azimuth inputs, serves to control the respective active devices 22A–D as a function of their azimuthal positions and in a manner to reduce BVI noise. The provision and use of the signal Pcv as a control variable in a mode which feeds back an accurate measure of BVI noise as it appears in the far field, assures the optimal minimization of that noise.

Although the invention has been described and illustrated with respect to the exemplary embodiments thereof, it should be understood by those skilled in the art that the foregoing and various other changes, omissions and additions may be made without departing from the spirit and scope of the invention.

I claim:

1. A method of providing a signal representative of blade vortex interaction (BVI) noise for a rotorcraft having a multi-blade rotor, said method comprising:
    a) measuring the fluid (air) pressure at one or more predetermined locations on a blade of the rotor during at least one predetermined azimuthal segment of the rotation of the blade during operation to provide respective pressure measurements;
    b) processing the respective pressure measurements to provide a signal; and
    c) providing the signal for use as a control variable in a control system for the active control of BVI noise.

2. A method as in claim 1 wherein the air pressure is measured within 10% blade chord length of the leading edge of the rotating blade.

3. A method as in claim 1 wherein one of said at least one azimuthal segments of blade rotation comprises a blade advancing region relative to forward flight of the rotorcraft.

4. A method as in claim 3 wherein said one of said at least one azimuthal segment is within the quadrant measured angularly forward 90° from the tail of the rotorcraft.

5. A method as in claim 3 wherein an other of said at least one azimuthal segments of blade rotation comprises a separate blade retreating region relative to forward flight of the rotorcraft.

6. A method of providing a signal representative of blade vortex interaction (BVI) noise for a rotorcraft having a multi-blade rotor, said method comprising:
    a) measuring the fluid (air) pressure at two or more predetermined locations on a blade of the rotor between 65 and 95% of the radial length of the blade during at least one predetermined azimuthal segment of the rotation of the blade during operation to provide respective pressure measurements;
    b) processing the respective pressure measurements to provide a signal; and
    c) providing the signal for use as a control variable in a control system for the active control of BVI noise.

7. A method of providing a signal representative of blade vortex interaction (BVI) noise for a rotorcraft having a multi-blade rotor, said method comprising:
    a) measuring the fluid (air) pressure at one or more predetermined locations on a blade of the rotor during at least one predetermined azimuthal segment of the rotation of the blade during operation to provide respective pressure measurements;
    b) processing the respective pressure measurements by filtering the pressure measurements to retain substantially only a frequency band commensurate with BVI sources to provide a signal; and
    c) providing the signal for use as a control variable in a control system for the active control of BVI noise.

8. A method of providing a signal representative of blade vortex interaction (BVI) noise for a rotorcraft having a multi-blade rotor, said method comprising:
    a) measuring the fluid (air) pressure at one or more predetermined locations on a blade of the rotor during at least one predetermined azimuthal segment of the rotation of the blade during operation to provide respective pressure measurements;
    b) processing the respective pressure measurements by filtering the pressure measurements to retain substantially only a frequency band commensurate with BVI sources;
    c) processing the filtered pressure measurements to provide a signal for use as a control variable, the processing being in accordance with:

$$Fn_1, n_2 = \sqrt{\frac{1}{n_2 - n_1 + 1} \sum_{n_1}^{n_2} f_n^2}, \text{ where}$$

where
   $Fn_1, n_2$ is the signal for use as the control variable,
   fn is the fourier amplitude over a specified azimuthal segment of blade rotation, and $n_1$ and $n_2$ are frequency limits based on n per full revolution; and
    d) providing the signal for use as a control variable in a control system for the active control of BVI noise.

9. A method of providing a signal representative of blade vortex interaction (BVI) noise for a rotorcraft having a multi-blade rotor, said method comprising:
    a) measuring the fluid (air) pressure at one or more predetermined locations on a blade of the rotor during at least one predetermined azimuthal segment of the rotation of the blade during operation to provide respective pressure measurements;
    b) processing the respective pressure measurements by filtering the pressure measurements to retain substantially only a frequency band commensurate with BVI sources, said band of retained frequencies being between about 20 and 48 times the rotation frequency of the rotor;
    c) processing the filtered pressure measurements to provide a signal for use as a control variable, the processing being in accordance with:

$$Fn_1, n_2 = \sqrt{\frac{1}{n_2 - n_1 + 1} \sum_{n_1}^{n_2} f_n^2}, \text{ where}$$

where
   $Fn_1, n_2$ is the signal for use as the control variable,
   fn is the Fourier amplitude over a specified azimuthal segment of blade rotation, and
   $n_1$ and $n_2$ are frequency limits based on n per full revolution; and
    d) providing the signal for use as a control variable in a control system for the active control of BVI noise.

10. A method as in claim 7 wherein the band of retained frequencies is between about 20 and 48 times the rotation frequency of the rotor.

11. A method as in claim 8 wherein the values of $n_1$ and $n_2$ are initially determined by wind tunnel measurements for a particular set of test conditions simulating descent and are subsequently correlated with BVI far field acoustic sound pressure levels for the same set of test conditions.

12. A method as in claim 11 wherein $n_1$ and $n_2$ are substantially 24 and 32 respectively.

13. A method as in claim 8 wherein the measuring step and the conditioning step are performed repetitively, multiple times for each revolution of the blade to provide a substantially continuous signal for use as the control variable.

* * * * *